(12) United States Patent
Bareis et al.

(10) Patent No.: US 6,634,080 B2
(45) Date of Patent: Oct. 21, 2003

(54) METHOD FOR PRODUCING PARCELS CONSISTING OF SHEET METAL PIECES

(75) Inventors: Alfred Bareis, Uhingen (DE); Roever Markus, Stuttgart (DE); Timo Drescher, Albershausen (DE); Jochen Kauffmann, Ebersbach (DE)

(73) Assignee: Schuler Pressen GmbH & Co. KG, Goeppingen (DE)

( * ) Notice: Subject to any disclaimer, the term of this patent is extended or adjusted under 35 U.S.C. 154(b) by 80 days.

(21) Appl. No.: 09/812,891

(22) Filed: Mar. 21, 2001

(65) Prior Publication Data

US 2001/0037552 A1 Nov. 8, 2001

(30) Foreign Application Priority Data

Mar. 21, 2000 (DE) .......................... 100 13 690

(51) Int. Cl.$^7$ .............................................. H02K 15/02
(52) U.S. Cl. .............................. 29/596; 29/598; 29/240; 29/733
(58) Field of Search ................ 29/240, 243, 517, 29/596, 598, 607, 609, 732, 733, 738; 310/42, 216, 217, 218, 254, 257, 258, 259

(56) References Cited

U.S. PATENT DOCUMENTS

| | | | | |
|---|---|---|---|---|
| 4,485,320 A | * | 11/1984 | Kawada et al. | ............. 310/217 |
| 6,018,207 A | * | 1/2000 | Saban et al. | .................. 29/738 |
| 6,131,268 A | * | 10/2000 | Neuenschwander | .......... 29/596 |
| 6,219,900 B1 | * | 4/2001 | Suzuki | ........................ 100/291 |
| 6,226,856 B1 | * | 5/2001 | Kazama et al. | ............... 29/596 |
| 6,369,687 B1 | * | 4/2002 | Akita et al. | .................. 310/216 |

FOREIGN PATENT DOCUMENTS

| | | |
|---|---|---|
| DE | 3925365 | 2/1991 |
| EP | 3027987 C2 | 2/1982 |
| EP | 0082537 | 6/1983 |
| EP | 0136740 | 4/1985 |
| EP | 0793332 | 9/1997 |
| FR | 2612703 | 9/1988 |
| JP | 11289728 | 10/1999 |

OTHER PUBLICATIONS

Copy of the International Search Report.

* cited by examiner

*Primary Examiner*—Gregory L. Hudson
*Assistant Examiner*—Peter deVore
(74) *Attorney, Agent, or Firm*—Crowell & Moring LLP

(57) ABSTRACT

Method for producing parcels consisting of sheet metal pieces, wherein the sheet metal pieces are arranged next to each other and assembled with each other into a parcel. Basically, bent sheet metal piece segments of a circumferential length that corresponds to an angle $\alpha=360°/n$ are created through a stamping process, with n corresponding to a positive integer and being larger or equal to two, with n of these sheet metal piece segments being arranged in one plane to a sheet metal piece. The sheet metal pieces that have been arranged next to each other are connected with at least one fastener and/or welded together.

10 Claims, 5 Drawing Sheets

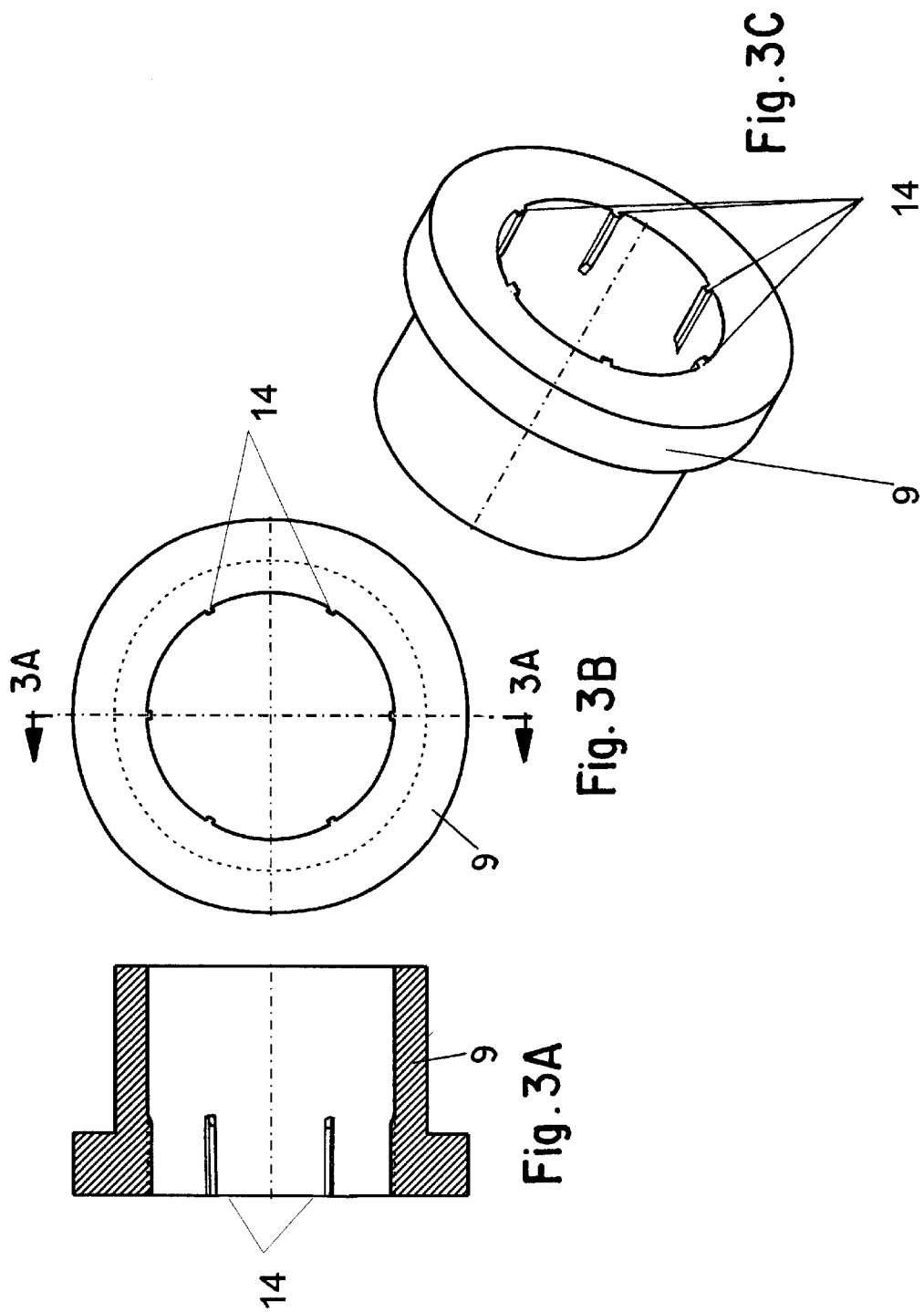

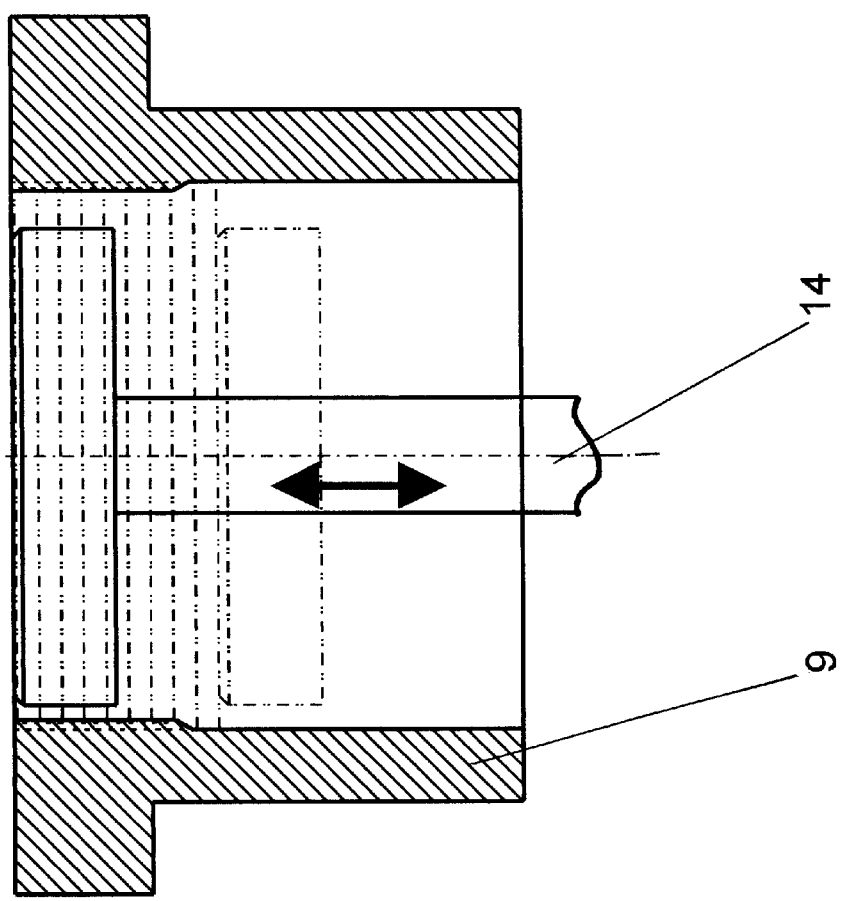

METHOD FOR PRODUCING PARCELS CONSISTING OF SHEET METAL PIECES

BACKGROUND OF THE INVENTION

This application claims the priority of German Application No. 100013690.7, filed Mar. 21, 2000, the disclosure of which is expressly incorporated by reference herein.

The present invention relates to a method and/or device for producing parcels, especially from dynamo sheets that have been divided into ring segments. Such a method is known e.g. from DE 30 27 987 C2, which describes an assembly method and a device with which ring segments are stacked, aligned, pressed and clamped automatically into a generator ring. At the same time, the method described there shows an overlapping of the ring segments.

The disadvantage of the known method is that the production of such a parcel requires an extraordinarily high number of components, which makes the equipment very expensive. Furthermore, EP 136 740 B1 describes a process for manufacturing parcels of annular, magnetic or other plates for small or medium-sized electric equipment, particularly alternating current generators for motor vehicles, wherein controlled sheet metal is used that has open slots on the inside, with bent sheet metal segments of a circumferential length that corresponds to an angle $\alpha=360°/n$ being cut in a stamping process.

The disadvantage here is again that high component requirements are involved in order to obtain a finished parcel, which makes the end product more expensive.

Furthermore, Oehler/Kaiser "Schnitt-, Stanz- und Ziehwerkzeuge" (Cutting, Stamping and Deep-Drawing Tools), Springer Publishing Company, 1962, is a book which describes that buttons, which appear on the other side, can be created on medium and heavy plates through a partial penetration of the blanking punch into the sheet metal; a method with which also riveted joints are produced (p. 43, FIGS. 45–48).

SUMMARY OF THE INVENTION

DE 31 50 770 A1 describes a method for producing parcels consisting of sheet metal pieces where the sheet metal pieces are arranged next to each other and assembled into a parcel. Here single-piece sheet metal is used, but this has the disadvantage that the percentage of waste is relatively high. An object of the invention therefore consists of improving a method and/or device of the above-described kind in such a way that a simple and inexpensive method, which also proves to be gentle toward the material that is utilized, as well as device for performing this method are achievable.

In accordance with the invention, this object has been achieved by providing that sheet metal pieces are arranged next to each other and assembled into a parcel, wherein basically bent sheet metal segments with a circumferential length that corresponds to an angle $\alpha=360°/n$, with n representing a positive integer and being larger than or equal to two, are created through a stamping process. Furthermore 'n' of these sheet metal segments are arranged in one plane to a sheet metal piece, with the sheet metal pieces that are arranged next to each other being assembled with at least one fastener.

The advantage here is that, on one hand, complete parcels are created without manual labor, and that on the other hand, double-digit percentage savings are achieved in the material consumption through the above-described production method of the parcels.

Other objects, advantages and novel features of the present invention will become apparent from the following detailed description of the invention when considered in conjunction with the accompanying drawings.

BRIEF DESCRIPTION OF THE DRAWINGS

FIGS. 3a–3d are respectively, cross-sectional, end, perspective and partial cross-sectional views through a version of a die plate.

DETAILED DESCRIPTION OF THE DRAWINGS

Figure 1B:
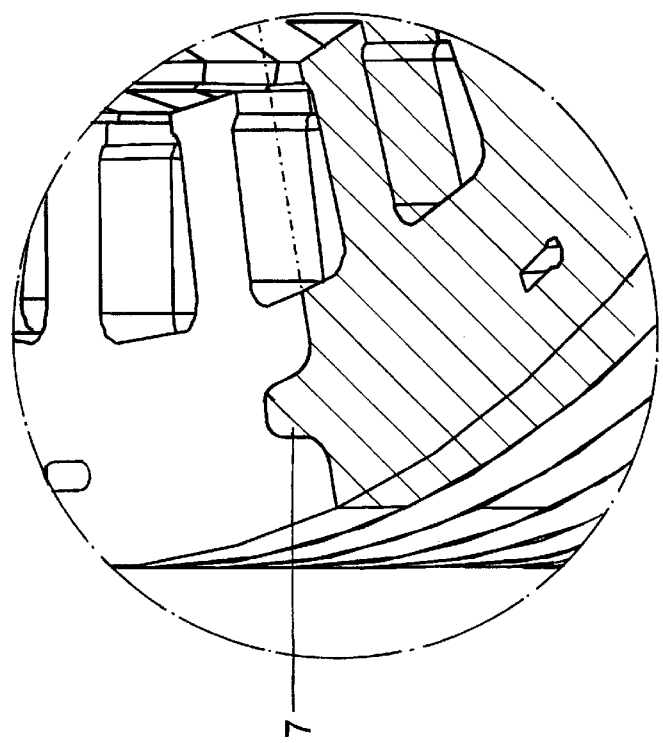
FIG. 1 is a perspective view of a select metal made of non-segments stamped into a parcel
Figure 1A:
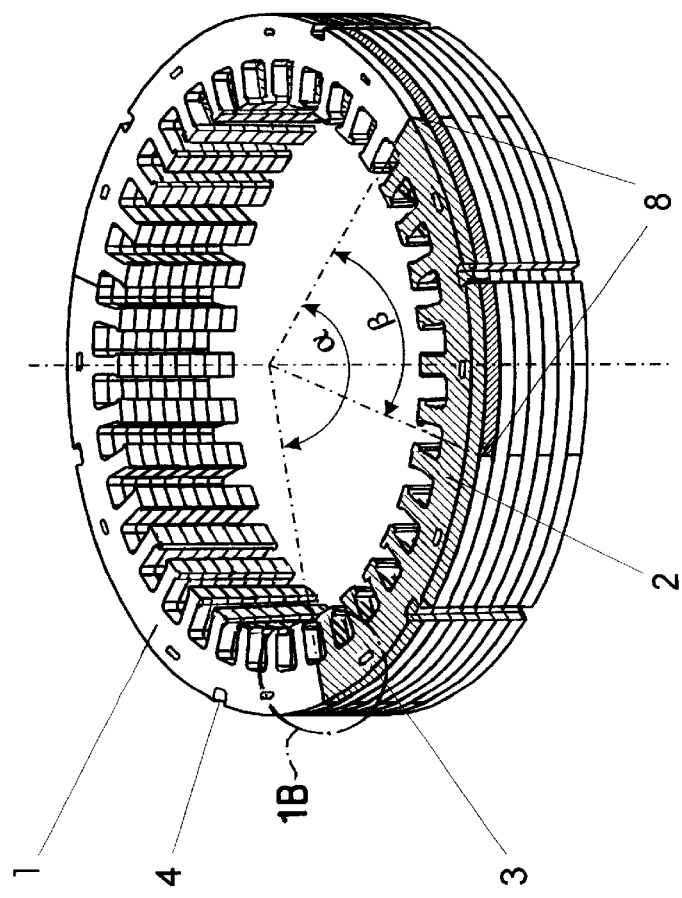

FIG. 1 shows a sheet metal stack made of ring segment sheets that have been stamped into a parcel. The sheet metal stack consists of several layers of ring-shaped assembled ring sheet metal segments. Each layer consists of X segments, wherein each segment forms an angle of $(360/X)°$. In practice, 3–6 segments per layer should be the rule. The following describes the method with the help of an example of three segments per layer at 120° each.

With this method, sheet metal piece segments 2 are stamped into a die plate on a press from a sheet metal strip. Each sheet metal piece segment 2 has two or more fasteners for the stamp-parceling process 3. The sheet metal piece segment 2 is fastened horizontally during the cutting process by sheet metal piece fastening contours 4.

Figure 2:
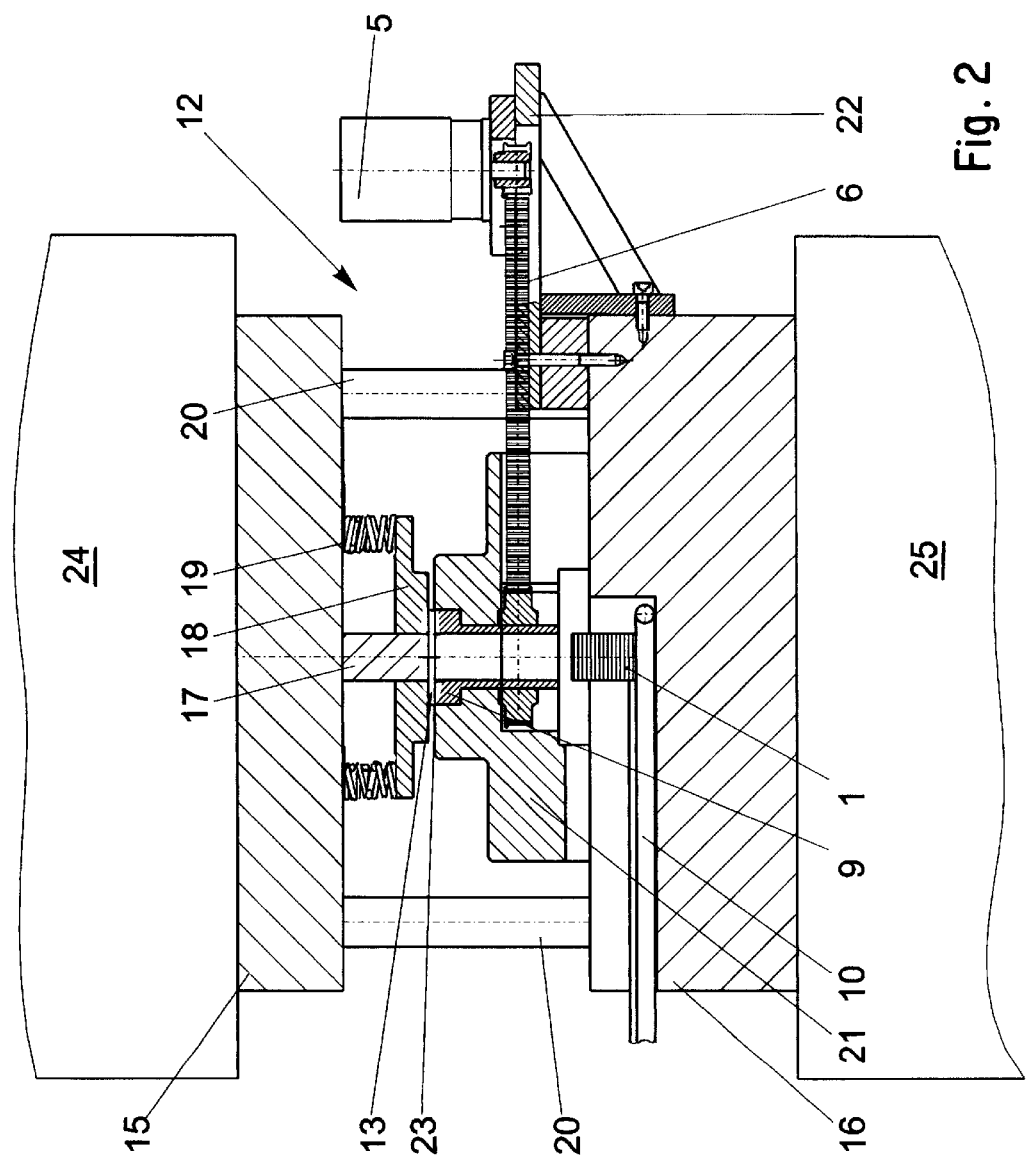
FIG. 2 is a cross-section through the device according to the present invention.

If the sheet metal piece fastening contours 4 are not permitted for electromagnetic reasons, then the sheet metal piece segments 2 are held in place with a pivoted interior mandrel (not shown). The segments are held vertically in the die plate 9 (FIGS. 3a, 3b, 2) through counter-pressure that is applied through cylinders or brake rings. The die plate 9 is rotated in the area around the upper dead center of the press by 120° through a servo motor or a different, e.g. mechanical, drive 5 with the help of a toothed belt 6 or another transmission device, as is shown in FIG. 2.

The entire process is repeated with two additional sheet metal piece segments 2 until the first layer of the stack is complete. Since the layer is not complete with the first two sheet metal piece segments, tilting of the parcel 1 is prevented with a compensating device in the die. The segments of one layer can additionally be connected with each other with special stamping contours 7 in an alternative embodiment.

Then the die plate is turned once by 60° in order to ensure that the next sheet metal layer is located on top of the first in a brickwork-like configuration (8). The segments of the second layer are held together with those of the first layer with two fasteners (principle of stamp-parcel process).

This procedure is repeated until the desired parcel height has been reached. Due to the common method of employing cutting dies during stamp-parceling, the first segments of a new parcel are stamped in such a way that they cannot bond with the last layer in the die plate. As soon as the counter-pressure from beneath subsides or is actively eliminated, the parcel drops through the die plate 9 onto a transfer plate and is transported away from the press 10.

The parcel 1 is completely finished on the press and the described tool. Another advantage of this method is a material savings of up to 40% for conventional stator production without rotor.

Systems where segments are stamped on a press 11 and assembled to a stack outside the press 11 are already being used. Furthermore solutions are available where straight segments are assembled into parcels and then bent into shape outside the press.

The parcel 1, which is shown in FIG. 1, consists basically of overlapping sheet metal piece segments 2, 8, indicated by the shaded metal sheets.

Each sheet metal piece segment 2 of a sheet metal piece plane is equipped with fasteners 3, which correspond to the fasteners of the adjoining sheet metal piece segments of another sheet metal piece plane. In the present example in accordance with FIG. 1, the fasteners 3 are created through the stamp-parceling process in such a way that the fasteners 3 of the overlapping sheet metal piece segments 2 connect with each other. In order to be able to assemble the three sheet metal piece segments 2 in the punching tool into a circular sheet metal piece, each sheet metal piece segment 2 is equipped with so-called sheet metal piece fastening contours 4, to which the sheet metal piece segments 2 in a pivoted die plate 9, which as shown in FIG. 3a are arranged on the inside of the die plate 9, correspond in such a way that the sheet metal piece segment 2 can be held in place and turned with the sheet metal piece fastening contour 4 and device 14.

In an alternative embodiment in accordance with FIG. 1, an additional punching contour 7 is provided on the fronts of the sheet metal piece segments 2, which are located in the same plane, wherein the fronts of the adjoining sheet metal piece segments 2 respectively are equipped with the corresponding design (male/female).

The individual sheet metal layers 8 are offset from each other. This offset design, which occurs between the contact planes of the sheet metal piece segments of adjoining sheet metal pieces, is shown in FIG. 1 as angle β. Angle β must be large enough to allow the fasteners 3 to engage with the fasteners of the adjoining sheet metal piece during the stamp-parceling process, despite the offset design. One particular example was already mentioned above, here α=120° and β=60° applies. In another embodiment the fasteners 3 have so-called rivet holes, through which commercial rivets are pushed in order to finish the parcel 1 subsequently through a riveting process. Another embodiment provides for the sheet metal pieces to be connected through a welding process. This can occur both in the area of the fasteners 3 and on the outer contour of the parcel 1. Additionally, another embodiment involves the connection of the sheet metal pieces through an adhesive as an addition to the abovementioned fastening types or also on its own.

FIG. 2 depicts the device for producing sheet metal parcels from sheet metal piece segments with a cross-sectional view in the sheet metal conveying direction. The shown device consists basically of a punching tool 12, which has an upper tool part 15 and a lower tool part 16. The upper tool part 15 is fastened on the tappet plate 24, the lower tool part 16 is arranged on the table top 25.

A stripper plate 18 containing a die 17 is arranged at a distance to and in a movable fashion toward the upper tool part 15 with several springs 19. The upper tool part 15 and the lower tool part 16 are arranged in a movable manner relative to each other through guide pillars 20. The die plate fastening plate 21 is located on the lower tool part 16. The die plate fastening plate 21 contains a die plate 9. The die plate 9 can pivot and is moved by a toothed belt 6.

The toothed belt 6 moving the die plate 9 is driven by a drive 5, e.g. an electric motor, which is arranged on a rack 22. In an alternative embodiment, the defined rotation (e.g. 120°/60°) can be integrated on its own through a mechanical drive in the tool, as we know it already from twisted parcels. Beneath the rotating die plate 9 a moving device 10, which in FIG. 2 is shown as a conveying belt, is arranged, on which the finished parcels 1 are moved. The feeding plane 23, in which the sheet metal 13 reaches the area of influence of the die 17 and the corresponding die plate 9, is located between the stripper plate 18 and the die plate top that is aligned with the upper/lower tool part. An alternative embodiment provides for the parcel to be welded in the device in accordance with FIG. 2 is also contemplated that each sheet metal layer is welded together with the next one through fasteners. Additionally, it provides for a welding process on the outer shell of the parcel.

FIGS. 3a–3c depict the rotating die plate 9 in a cross-sectional, top and perspective views. They show the way the sheet metal piece fastening device 14 is arranged, which in the present example is depicted as a so-called dovetail.

The rotating die plate 9 depicted in a cross-sectional and a top view in accordance with FIG. 3d also showing a sheet metal piece fastening device 14, which in this version is shown as a so-called pressure pad. The shown pressure pad presses from beneath against the growing and downward pushing parcel and thus supports production of the parcel. The pressure pad consists of different lengths and releases the parcel once the specified size has been reached.

Figure 4:
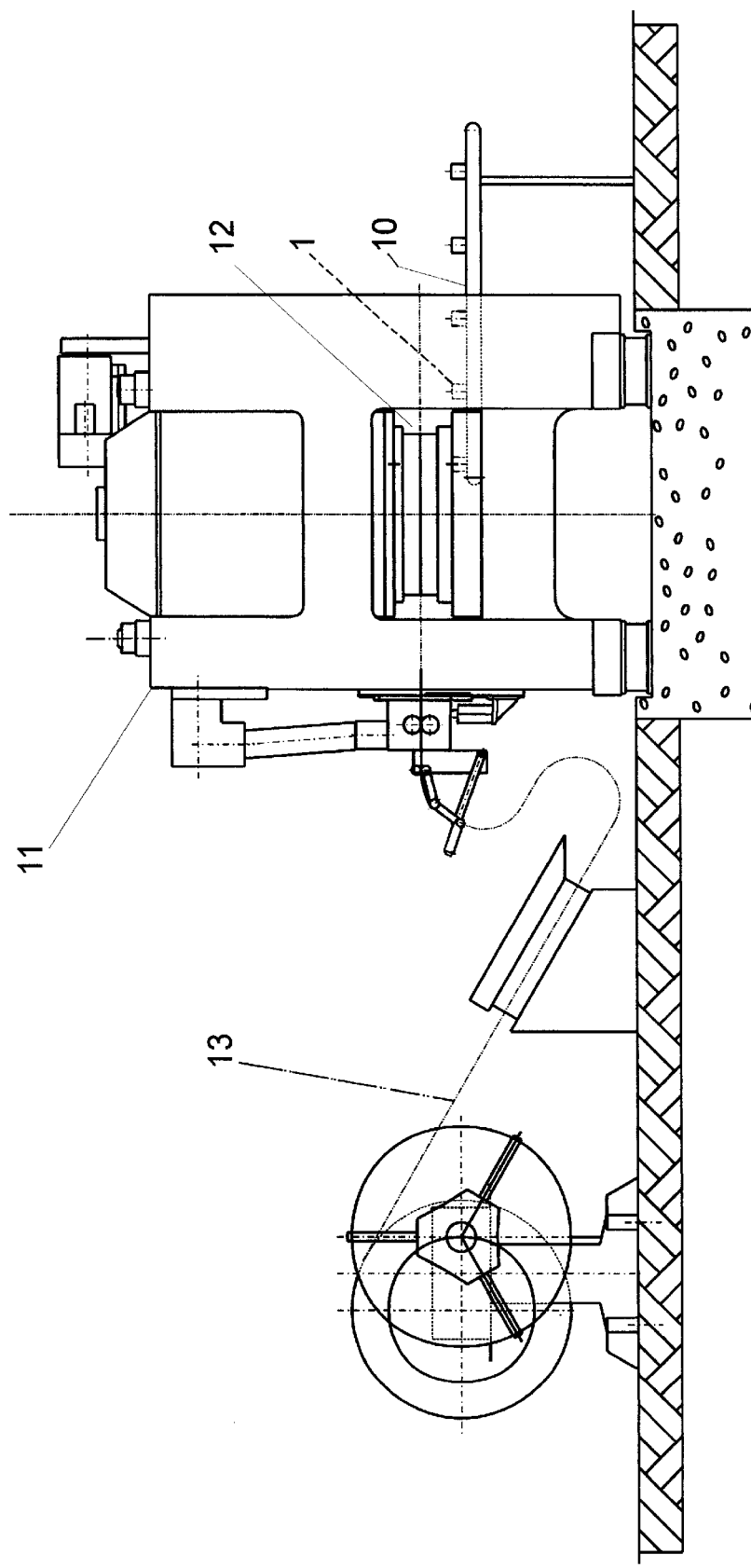
FIG. 4 is a side view of an overall piece of equipment

FIG. 4 shows the diagrammatic view of a device for producing such parcels. Here sheet metal 13 on a reel is fed into a press 11. The press 11 contains a cutting tool 12, which produces stator parcels in the above-described manner, which are then transported by the moving device 10 after reaching a specified parcel height.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method of producing stacks of sheet metal pieces in which an apparatus is employable having at least one stamping device, at least one tool for producing sheet metal piece segments configured to be at least one of rotatably and vertically adjustable, at least one sheet metal part segment holding device, and one or more of at least one stacking device, at least one gluing device and at least one welding device, comprising the sheet metal pieces with one another to form a stack producing substantially curved sheet metal piece segments with a circumferential length corresponding to an angle α=360°/n, "n" being a whole positive number which is equal to or larger than two, arranging "n" of the sheet metal piece segments in a plane with respect to a sheet metal piece, using at least one connection element to connect the stacked sheet metal pieces, and completed, finishing the stacks with the at least one tool.

2. Method in accordance with claim 1, wherein stacks are at least one of glued, welded and stamped together.

3. Method in accordance with claim 2, wherein at least one fastener is provided per sheet metal piece segment.

4. Method in accordance with claim 3, wherein the fastener comprise a plurality of fasteners arranged to be connected with fasteners of at least one other adjoining sheet metal piece.

5. Method in accordance with claim 1, wherein the sheet metal pieces arranged next to each other are arranged offset so that at least one contact plane of the sheet metal piece segments of one sheet metal piece deviate from at least one contact plane of the sheet metal piece segments of at least one directly adjacent sheet metal piece.

6. Apparatus capable of implementing the method according to claim 1, comprising at least one stamping device, at least one tool for producing sheet metal piece segments, at least one sheet metal piece segment holding device being configured to be at least one of rotatably and vertically adjustably movable, and one or more of at least one stamping stacking device, at least one gluing device and at least one welding device.

7. Apparatus according to claim 6, wherein the sheet metal piece holding device comprises one or more sheet metal piece segments.

8. Apparatus according to claim 7, wherein the sheet metal piece holding device has at least one of an interlocking configuration and a non-positive configuration.

9. Apparatus according to claim 7, further comprising at least one die plate.

10. Apparatus according to claim 7, further comprising at least one rotatable interior mandrel for fastening the sheet metal piece segments.

* * * * *